United States Patent Office 3,725,103
Patented Apr. 3, 1973

3,725,103
CARBON BLACK PIGMENTS
Merrill E. Jordan, Walpole, William G. Burbine, Whitman, and Frank R. Williams, Quincy, Mass., assignors to Cabot Corporation, Boston, Mass.
No Drawing. Filed Mar. 10, 1971, Ser. No. 123,081
Int. Cl. C08h 17/08
U.S. Cl. 106—307                                    10 Claims

ABSTRACT OF THE DISCLOSURE

A family of new and novel carbon black products having unusually high tint which are suitable for use in the preparation of reinforced rubber systems.

---

This invention relates to a family of new and novel carbon black products which are suitable for use in reinforcing rubber compositions. More particularly, this invention relates to a new type of carbon black products prepared by a furnace process which, while not aftertreated, yet have physical properties which render the blacks different from any other conventionally known types or grades of carbon blacks. The unique combination of properties possessed by the novel furnace carbon black products of the present invention include a tint value of at least about 200, a value for the relationship of [tint+0.6($D_a$)] of at least about 317, and a pH of at least 4.0. In a preferred embodiment of the present invention, the family of novel carbon blacks is characterized by having tints ranging from about 220 to about 290 and in a still further preferred embodiment tints ranging from about 230 to about 275. In a preferred embodiment of the present invention, the novel carbon black products possess a value for the relationship of [tint+0.6($D_a$)] of at least about 320.

Accordingly, it is a primary object of this invention to provide a family of novel carbon black products characterized by having small particle sizes, narrow particle size distributions and unusually high tint per unit area values for a given area level.

It is a further object to provide a family of novel carbon black products which exhibit desirable reinforcing properties when incorporated in rubber compositions.

Other and different objects, advantages and features of the present invention will become apparent to those skilled in the art upon consideration of the following detailed description and claims.

In accordance with this invention, it has been found that the above and still further objects are achieved by the preparation of a family of novel carbon black products which are of the furnace process type, are non-aftertreated, possess tint values, determined on pelletized carbon blacks, of at least about 200, a value for the relationship of [tint+0.6($D_a$)] of at least about 317, and a pH of at least 4.0. In this relationship, $D_a$, the apparent diameter, is defined as the diameter, in millimicrons, of a solid carbon sphere containing the same amount of carbon as the average amount of carbon per agglomerate in a paper by Avrom I. Medalia and L. Willard Richards entitled "Tinting Strength of Carbon Black" presented to the American Chemical Society, Division of Coatings and Plastic Chemistry, Toronto, Canada, May 1970. The apparent diameter, $D_a$, is readily obtained from the calculation [2270+63.5(DBP)]/Iodine Surface Area expressed in units of square meters per gram.

The heretofore-described novel group of carbon black products can be readily prepared by contacting a carbon black-yielding feedstock with a stream of hot combustion gases flowing at an average linear velocity of at least 100 feet per second. The process for preparing the novel carbon blacks of the present invention will be described in greater detail hereinafter.

In the preparation of the hot combustion gases employed in preparing the novel type of carbon black products of the present invention there are reacted in any conventional combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components, and, in particular, hydrocarbons. For example, streams rich in methane such as natural gas and modified or enriched natural gas are excellent fuels as well as other streams containing high amounts of hydrocarbons such as various petroleum gases and liquids and refinery by-products including ethane, propane, butane, and pentane fractions, fuel oils and the like.

The carbon black products of the present invention are prepared by reacting the aforementioned combustion reaction products with any of a wide variety of hydrocarbon feedstocks which are readily volatilizable under the conditions of the reaction. Suitable for use as hydrocarbon feedstocks are unsaturated hydrocarbons such as acetylene, olefins such as ethylene, propylene, butylene, aromatics such as benzene, toluene and xylene, saturated hydrocarbons such as methane, natural gas, ethane and propane and volatized hydrocarbons such as kerosenes, naphthalenes, terpenes, ethylene tars, aromatic cycle stocks and the like.

Accordingly, in greater detail, the novel carbon black products are prepared by reacting a carbon black-yielding hydrocarbon feedstock with hot gaseous products of an initial combustion reaction which are flowing at a high linear velocity in a suitable reaction zone. The hot combustion gases are readily generated by contacting a combustible fuel with an amount of oxidant, such as air or oxygen, varying from about 50 to about 500 percent f the amount required for complete combustion of the combustible fuel to the desired hot gaseous products in any type of conventionally known burner designed to produce a stream of hot combustion gases flowing at a high linear velocity. It is, furthermore, desirable that there be a pressure differential between the combustion chamber and the reaction chamber of at least 1.0 p.s.i., and more preferably, of about 1.5 to about 10 p.s.i. Under these conditions, there is produced a stream of gaseous combustion products possessing sufficient energy to convert a carbon black-yielding hydrocarbon feedstock to the desired carbon black products. The resultant combustion gases emanating from the combustion zone attain temperatures of at least about 2400° F., with the most preferable temperatures being at least about 3000° F. The hot combustion gases are propelled in an upstream direction at a high linear velocity which may be effectuated by passing the combustion gases through any suitable passage or inlet which may optionally be tapered or restricted such as a conventional venturi throat. There is then introduced into the stream of hot combustion gases traveling at a high velocity at a point where there exists a pressure differential between the combustion chamber and the reaction chamber of above about 1.0 p.s.i., a suitable carbon black-yielding hydrocarbon feedstock thereby insuring a high rate of mixing and shearing of the hot combustion gases and the hydrocarbon feedstock so as to rapidly and completely decompose and convert the feedstock to the novel carbon blacks in high yields. The hydrocarbon feedstock is injected substantially transversely from the periphery of the stream of hot combustion gases in the form of a single or a plurality of small, coherent jets which penetrate into the interior regions of the stream of combustion gases. In the practice of the present process, the hydrocarbon feedstock may be introduced into the combustion gas stream as a liquid or liquid spray by means of a conventional atomizer or spray nozzle as well as in the form of a gas or vapor. The amount of feedstock utilized will be adjusted in relation to the amounts of fuel and oxidant employed so as to result in an overall percent combustion for the process ranging from about 15 to about 60 percent and preferably, from about 20 to about 50 percent. Following the period of reaction in the reaction zone, the effluent gases containing the desired carbon black products suspended therein are passed downstream to any conventional cooling and separating means whereby the carbon blacks are recovered. The separation of the carbon black from the gas stream is readily accomplished by conventional means such as a precipitator, cyclone separator and bag filter. Moreover, although the residence time for each instance depends upon the particular conditions and the particular carbon black desired, the residence time of the present process may vary from about 1 to about 100 milliseconds, or even shorter periods of time.

The following testing procedures are used in the determination and evaluation of the physical properties and efficiency of the carbon blacks of the present invention.

DBP absorption.—In accordance with the procedure set forth in ASTM D-2414-65T, absorption characteristics of pelleted carbon blacks are determined. In brief, the test procedure entails adding dibutyl phthalate (DBP) to a pelleted carbon black until a transition from a free-flowing powder to a semi-plastic agglomerate results in a sharp increase in viscosity. The value is expressed as milliliters of dibutyl phthalate (DBP) per 100 grams of carbon black.

Iodine surface area.—In accordance with the following iodine adsorption technique, the surface area of pelletized carbon black products is determined. In this procedure, a carbon black sample is initially devolatilized over a seven-minute period at a temperature of 1700° F. in a muffle furnace and then allowed to cool. The top layer of calcined carbon black is discarded to a depth of one fourth inch and the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a blank sample. Finally, the iodine surface area expressed in square meters per gram is calculated in accordance with the formula $$\frac{(\text{percent iodine adsorbed} \times 0.937) - 4.5}{\text{sample weight}} = \text{iodine surface area}$$

Tint—Tint or tinting strength represents the relative covering power of a pelletized carbon black when incorporated in a 1 to 37.5 weight ratio with a standard zinc oxide dispersed in a epoxyized soybean oil type plasticizer and compared to a series of standard reference blacks tested under the same conditions. More particularly, the test involves mulling carbon black, zinc oxide, and plasticizer, in such proportions that the resulting ratio of carbon black to zinc oxide is 1 to 37.5. Reflectance measurements utilizing a Welch Densichron apparatus are then obtained from a film cast on a glass plate and the readings are compared to carbon black standards having known tinting strengths. The tinting strengths of the carbon black standards are determined utilizing an arbitrarily assigned value of 100 for the tinting strength of a standard SRF carbon black.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example, there is employed a suitable reaction apparatus provided with means for supplying the combustion gas-producing reactants, i.e., a fuel and an oxidant stream, either as separate streams or as pre-combusted gaseous reaction products, and also means for supplying the carbon black-yielding hydrocarbon feed stock to the apparatus. The apparatus may be constructed of any suitable material such as metal and either provided with a refractory insulation or surrounded by means for cooling such as a recirculating liquid which is preferably water. Additionally, the reaction apparatus is equipped with temperature and pressure recording means, means for quenching the carbon black-forming reaction such as spray nozzles, means for cooling the carbon black product and means for separating and recovering the carbon black from other undesired by-products. Accordingly, in carrying out the present process for preparing the novel carbon blacks, the following procedure is employed. In order to obtain the desired flame, there are charged into a combustion zone of the apparatus through one or more inlets air preheated to a temperature of 750° F. at a rate of 330,000 s.c.f.h. and natural gas at a rate of 23,500 s.c.f.h. thereby generating a stream of combustion gases flowing in a downstream direction at a high linear velocity which possesses a kinetic head of at least 1.0 p.s.i. greater than the pressure of the reaction chamber. Accordingly, in a preferred embodiment of the present invention, the rapidly flowing stream of combustion gases is passed through a constricted or tapered portion of the apparatus having a fixed cross section or throat such as a conventional venturi throat in order to increase the linear velocity of the stream of combustion gases. There is then introduced transversely into the resultant stream of hot combustion gases having the desired kinetic head a carbon black-yielding hydrocarbon feedstock under a pressure of 290 p.s.i.g. through one or more passages or inlets located peripherally to the stream of combustion gases at a rate of 625 gallons per hour. The hydrocarbon feedstock employed is Gulf Oil which is a fuel having a carbon content of 90.3% by weight, a hydrogen content of 7.9% by weight, a sulfur content of 1.9% by weight, a hydrogen to carbon ratio of 1.04, a B.M.C.I. Correlation Index of 126, a specific gravity in accordance with ASTM D-287 of 1.07, an API gravity in accordance with ASTM D-287 of 0.4, an SSU viscosity (ASTM D-88) at 130° F. of 95.2, an SSU viscosity (ASTM D-88) at 210° F. of 40.4 and an asphaltenes content of 2.5 percent. There is further added to the reaction zone 9.1 grams of potassium chloride for each 100 gallons of fuel utilized. The reaction conditions used in this instance are such as to provide an overall combustion of 27.5 percent. The carbon black forming reaction is then quenched with water at a temperature of 1250 to 1300° F. in a separate zone downstream of the reaction zone and the resultant carbon black-containing gases are subjected to the conventional steps of cooling, separation and recovery of the carbon black product in a yield of 5.28 pounds per gallon of fuel. The carbon black product thus obtained is characterized by having a tint value of 234, an iodine surface area of 63.0, a DBP absorption value of 106, a pH of 7.8, an apparent diameter, $D_a$, of 143, a value for the relationship of $[\text{tint} + 0.6(D_a)]$ of 320.

EXAMPLE 2

A suitable reaction apparatus as described in Example 1 is charged with air preheated to 750° F. at a rate of 342,000 s.c.f.h. and natural gas at a rate of 31,400 s.c.f.h.. in order to produce a suitable flame for carrying out the reaction. To the downstream-flowing combustion gases which have been passed through a constricted or tapered portion of the apparatus there is then fed the Gulf Oil hydrocarbon feedstock under a pressure of 230 p.s.i.g. and at a rate of 506 gallons per hour. Potassium chloride is introduced in an amount of less than 1 gram per 100 grams fuel. In this run, the reaction conditions are maintained in a manner such as to provide an overall combustion of 31.5 percent and the water quenches are maintained at 1300 to 1350° F. At the conclusion of the reaction there is produced in a yield of 5.6 pounds per gallon fuel a carbon black product having a tint value of 238, an iodine surface area of 69 square meters per gram, a DBP absorption value of 124, an apparent diameter, $D_a$ of 147, a value for the relationship $$[tint+0.6(D_a)]$$

of 326, and a pH value of 7.5.

EXAMPLE 3

In accordance with the procedure of Example 1, air preheated to 750° F. at a rate of 322,000 s.c.f.h. and natural gas at a rate of 31,400 s.c.f.h. are fed into the combustion zone of the reaction apparatus. To the resultant downstream flow of hot combustion gases there is charged Gulf Oil hydrocarbon feedstock under a pressure of 270 p.s.i.g. at a rate of 364 gallons per hour. Prior to adding the feedstock, potassium chloride is added to the stream of hot combustion gases in an amount of 11 grams per 100 gallons fuel. The reaction is carried out at an overall combustion of 37.4 percent and the quenching water is maintained at 1250 to 1300° F. There is obtained, in a yield of 5.4 pounds per gallon fuel oil, a carbon black product having a tint value of 266, an iodine surface area of 98, a DBP absorption value of 113, a pH of 7.5, an apparent diameter, $D_a$, of 96.4, a value for $[tint+0.6(D_a)]$ of 324.

EXAMPLE 4

Following the procedure of Example 1 there are charged to a combustion zone a stream of air at a temperature of 750° F. at a rate of 318,000 s.c.f.h. and a stream of natural gas at a rate of 17,450 s.c.f.h. to produce the desired flame. Into the gaseous products of the combustion reaction there is then fed under a pressure of 315 p.s.i.g. as the hydrocarbon feedstock Gulf Oil at a rate of 521 gallons per hour and the reaction conditions are maintained so as to produce an overall combustion of 32.5 percent. During the preparation of the carbon black of this example, which is produced in a yield of 4.3 pounds per gallon fuel oil, potassium chloride is added in an amount of 11.5 grams per 100 grams of fuel oil and the quench is carried out using water maintained at 1250 to 1300° F. The resultant carbon black product is characterized by having an iodine surface area of 100 m.$^2$/gm., a DBP absorption value of 113, a tint value of 265, a pH of 7.1, an apparent diameter, $D_a$, of 94.4, and a value for $[tint+0.6(D_a)]$ of 322.

EXAMPLE 5

Following the procedure of Example 1, air at a rate of 350,000 s.c.f.h. and natural gas at a rate of 24,650 s.c.f.h. are fed into the combustion zone of the reaction apparatus. To the resultant downstream flow of hot combustion gases there is charged Gulf Oil feedstock at a rate of 374 gallons per hour. The reaction is carried out at an overall combustion of 42.3 percent and there is obtained a carbon black product having an iodine surface area of 116 m.$^2$/gm., a DBP absorption value of 112, a tint value of 275, a pH of 6.0, an apparent diameter, $D_a$, of 80.9 and a value for $[tint+(D_a)]$ of 323.

EXAMPLE 6

In accordance with the procedure of Example 1, oxygen at a rate of 3000 s.c.f.h. and natural gas at a rate of 540 s.c.f.h. are fed into the combustion zone of the reaction apparatus. To the resultant downstream flow of hot combustion gases there is charged Sunray DX hydrocarbon feedstock at a rate of 28 gallons per hour and the reaction is carried out at a combustion of 28.5 percent. Sunray DX is a fuel having a carbon content of 91.1% by weight, a hydrogen content of 7.9% by weight, a sulfur content of 1.3% by weight, a hydrogen to carbon ratio of 1.04, a B.M.C.I. Correlation Index of 133, a specific gravity in accordance with ASTM D-287 of 1.09, an API gravity in accordance with ASTM D-287 of −2.6, an SSU viscosity (ASTM D-88) at 130° F. of 350, an SSU viscosity (ASTM D-88) at 210° F. of 58 and an asphaltenes content of 5.7 percent. There is obtained a carbon black product having an iodine surface area of 140 m.$^2$/gm., a DBP absorption value of 156, a tint of 268, an apparent diameter, $D_a$ of 87, a value for $[tint+0.6(D_a)]$ of 320, and a pH of 8.4.

EXAMPLE 7

Following the procedure of Example 1, there are introduced into the combustion zone of the apparatus oxygen at a rate of 2000 s.c.f.h. and natural gas at a rate of 625 s.c.f.h. in order to produce the desired flame. Into the flow of hot combustion gases emanating from the combustion zone, there is then charged, as the hydrocarbon feedstock, Sunray DX at a rate of 16.3 gallons per hour. Potassium chloride is added in an amount of 19.3 grams per 100 gallons feedstock and the reaction is carried out at a combustion of 29.8 percent. The resultant carbon black product has an iodine surface area of 87 m.$^2$/gm., a DBP absorption value of 117, a tint of 265, a pH of 7.1, an apparent diameter, $D_a$, of 111.5 and a value for $[tint+0.6(D_a)]$ of 332.

EXAMPLE 8

According to the procedure of Example 1, oxygen at a rate of 2000 s.c.f.h. and natural gas at a rate of 775 s.c.f.h. are fed into the combustion zone of the reaction apparatus until the desired flame is produced. To the downstream flow of hot gaseous products of the combustion reaction there is introduced a hydrocarbon feedstock at a rate of 13.3 gallons per hour. The hydrocarbon feedstock utilized is Sunray DX as described hereinabove. The reaction is carried out at an overall combustion of 33.3 percent. The resultant carbon black product is characterized by having an iodine surface area of 127 m.$^2$/gm., a DBP absorption value of 215, a tint of 247, a pH of 8.1, an apparent diameter, $D_a$, of 125, and a value for $[tint+0.6(D_a)]$ of 322.

EXAMPLE 9

According to the procedure of Example 1, air at a rate of 330,000 s.c.f.h. and natural gas at a rate of 23,500 s.c.f.h. are fed into the combustion zone of the reaction apparatus until the desired flame is produced. To the downstream flow of hot gaseous products of the combustion reaction there is introduced Gulf Oil hydrocarbon feedstock at a rate of 490 gallons per hour. Potassium chloride is added in an amount of 9.1 grams per 100 gallons of feedstock. The overall combustion of the run is 33.3 percent. The resultant carbon black product has an iodine surface area of 101 m.$^2$/gm., a DBP absorption value of 115, a tint of 268, a pH of 8.8, an apparent diameter, $D_a$, of 94.8, and a value for $[tint+0.6(D_a)]$ of 325.

The novel carbon black products of the present invention are useful in the preparation of reinforced natural and/or synthetic rubber compositions. Indeed, the present carbon blacks when incorporated into rubber compositions result in high modulus and tensile strengths while other properties of the rubber composition are not adversely affected. For example, when 50 parts by weight of a carbon black of Example 9 are mill rolled with 100 parts of natural rubber, 3 parts of stearic acid, 5 parts of zinc oxide, 0.6 part of mercaptobenzothiazyl disulfide and 2.5 parts of sulfur, there is obtained a rubber vulcanizate having a 300% modulus at 30 minute cure of 2665 p.s.i., a tensile strength at 30 minute cure of 4565 p.s.i., an elongation of 490%, a viscosity ML–4' at 250° F. of 49.5, a Shore A hardness of 73.0, and a Goodyear-Healy rebound of 63.2 percent. Moreover, when 50 parts by weight of the carbon black of Example 9 are mill rolled with 100 parts by weight of styrene-butadiene polymer, 1.5 parts by weight of stearic acid, 5 parts by weight of zinc oxide, 2 parts by weight of mercaptobenzothiazyl disulfide and 2 parts by weight of sulfur, there is produced a rubber vulcanizate having a viscosity ML–4' at 212° F. of 88, a tensile strength at 50 minute cure of 4985 p.s.i., a 300% modulus at 50 minute cure of 2365 p.s.i., an elongation of 540%, a Shore A hardness of 74, and a Goodyear-Healy rebound of 53.4 percent.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A furnace-type carbon black product characterized by having a tint value of at least about 200, pH value of at least 4, and a value for the relationship of [tint $+0.6(D_a)$], wherein $D_a$ is apparent diameter, of at least about 317.

2. A furnace-type carbon black product as defined in claim 1 wherein the tint value ranges from about 220 to about 290.

3. A furnace-type carbon black product as defined in claim 1 wherein the tint value ranges from about 230 to about 275.

4. A furnace-type carbon black product as defined in claim 1 wherein the pH value ranges from about 6 to about 9.

5. A furnace-type carbon black product as defined in claim 1 wherein the value for the relationship of [tint $+0.6(D_a)$], wherein $D_a$ is apparent diameter, of at least about 320.

6. A furnace-type carbon black product as defined in claim 1 wherein the tint value is 234, the pH value is 7.8, and the value for [tint$+0.6(D_a)$] is 320.

7. A furnace-type carbon black product as defined in claim 1 wherein the tint value is 268, the pH value is 8.4, and the value for [tint$+0.6(D_a)$] is 320.

8. A furnace-type carbon black product as defined in claim 1 wherein the tint value is 265, the pH value is 7.1, and the value for [tint$+0.6(D_a)$] is 322.

9. A furnace-type carbon black product as defined in claim 1 wherein the tint value is 266, the pH value is 7.5, and the value for [tint$+0.6(D_a)$] is 324.

10. A furnace-type carbon black product as defined in claim 1 wherein the tint value is 238, the pH value is 7.5, and the value for [tint$+0.6(D_a)$] is 326.

References Cited
UNITED STATES PATENTS

| | | | |
|---|---|---|---|
| 3,010,794 | 11/1961 | Friauf et al. | 106—307 |
| 3,010,795 | 11/1961 | Friauf et al. | 106—307 |
| 3,222,202 | 12/1965 | Jordan et al. | 106—307 |
| 3,307,911 | 3/1967 | Krejci | 106—307 |
| 3,408,165 | 10/1968 | Hinson | 106—307 |
| 3,574,547 | 4/1971 | Hinson | 106—307 |

JAMES E. POER, Primary Examiner

U.S. Cl. X.R.

423—445